United States Patent
Kondou

(10) Patent No.: US 7,429,004 B2
(45) Date of Patent: Sep. 30, 2008

(54) NOZZLE STRUCTURE IN WASHER FLUID EJECTION APPARATUS

(75) Inventor: Takatoshi Kondou, Seta-gun (JP)

(73) Assignee: Mitsuba Corporation, Kiryu-Shi (JP)

( * ) Notice: Subject to any disclaimer, the term of this patent is extended or adjusted under 35 U.S.C. 154(b) by 880 days.

(21) Appl. No.: 10/381,183

(22) PCT Filed: Sep. 19, 2001

(86) PCT No.: PCT/JP01/08157

§ 371 (c)(1),
(2), (4) Date: Apr. 1, 2003

(87) PCT Pub. No.: WO02/26537

PCT Pub. Date: Apr. 4, 2002

(65) Prior Publication Data
US 2003/0178506 A1    Sep. 25, 2003

(30) Foreign Application Priority Data

Sep. 26, 2000    (JP) .............................. 2000292193

(51) Int. Cl.
  *B05B 1/10* (2006.01)
  *B60S 1/46* (2006.01)
  *B05B 1/00* (2006.01)
(52) U.S. Cl. ................. 239/284.1; 239/284.2; 239/600; 239/590; 239/592; 239/597
(58) Field of Classification Search ............. 239/284.1, 239/284.2, 600, 590, 592, 597, 601
See application file for complete search history.

(56) References Cited

U.S. PATENT DOCUMENTS

| | | | |
|---|---|---|---|
| 3,521,824 A * | 7/1970 | Wilcox | 239/424.5 |
| 4,346,849 A * | 8/1982 | Rood | 239/597 |
| 5,975,431 A * | 11/1999 | Harita et al. | 239/284.1 |
| 6,082,636 A | 7/2000 | Yoshida et al. | |
| 6,354,515 B1 * | 3/2002 | Matsumoto et al. | 239/284.1 |

(Continued)

FOREIGN PATENT DOCUMENTS

JP    61-19454    2/1986

(Continued)

OTHER PUBLICATIONS

Patent Abstracts of Japan, Publication No. JP-A-H09-315270, Dec. 9, 1997, Asmo Co. Ltd, Application No. 08-160730, all figures.*

*Primary Examiner*—Len Tran
*Assistant Examiner*—James S Hogan
(74) *Attorney, Agent, or Firm*—Oliff & Berridge, PLC

(57) ABSTRACT

At a time of forming lip portions in upper and lower edge portions of an ejection port in a protruding manner, a nozzle for ejecting a washer fluid of a washer fluid ejection apparatus in a diffusion manner is structured such that a step surface is formed on an inner side surface such that protruding amounts of the lip portions are set to the same length with a protruding tip portion in a washer fluid ejection side of the lower lip portion positioned lower than a lower side edge portion of the ejection port. Accordingly, it is possible to make the ejected washer fluid substantially unaffected by the air flow during vehicle movement.

10 Claims, 6 Drawing Sheets

U.S. PATENT DOCUMENTS

| | | | |
|---|---|---|---|
| 6,360,969 B1 * | 3/2002 | Egner-Walter et al. | 239/284.1 |
| 6,360,973 B1 * | 3/2002 | Stilli | 239/590 |
| 6,393,652 B1 * | 5/2002 | Vogt | 15/250.04 |

FOREIGN PATENT DOCUMENTS

| | | |
|---|---|---|
| JP | 61-31958 | 2/1986 |
| JP | 63-242360 | 10/1988 |
| JP | 2-125874 | 10/1990 |
| JP | 3-17953 | 4/1991 |
| JP | A-H09-315270 | 12/1997 |
| JP | A-H10-202149 | 8/1998 |
| JP | 11-34812 | 2/1999 |
| JP | 2000-52939 | 2/2000 |

* cited by examiner

NOZZLE STRUCTURE IN WASHER FLUID EJECTION APPARATUS

BACKGROUND OF THE INVENTION

1. Field of the Invention

The present invention relates to a technical field of a nozzle structure in a washer fluid injection apparatus which supplies a washer fluid to a windshield of a vehicle.

2. Description of the Related Art

In general, a washer fluid supplying apparatus is provided in the vicinity of a window surface, for example, in the vicinity of a windshield of a vehicle, and a structure is made such that a soil on the windshield is washed by injection of the washer fluid onto the windshield as occasion demands and a wiping operation by a wiper blade. In this structure, various kinds of proposals have been conventionally made with respect to a shape of the injection nozzle for improving a washing efficiency. As this kind of nozzle, there has been suggested a diffusion type nozzle in which an injection port of the washer fluid is formed in a long rectangular shape in a lateral direction. In this structure, the washer fluid is applied to a wide range of the window surface and it is possible to efficiently wipe and wash the windshield by the wiper blade even with a little fluid amount. However, in the injection by this diffusion type nozzle, a grain diameter of the washer fluid becomes smaller as the washer fluid is apart from a nozzle center (corresponding to a preset injection hitting point). Further, in this case, the range in which the washer fluid is applied to the window surface is previously set so as to be optimum in a stopping state of the vehicle. Accordingly, in the case of injecting the washer fluid while the vehicle travels, the application range of the washer fluid tends to be lower than the preset range. Further, in the case that the washer fluid is injected in the diffusion shape, a distribution of the grain diameter of the washer fluid is uniform in a vertical direction, as shown in FIG. 6A and a washer fluid drop of a smaller grain diameter which has been injected to an outer periphery side (an outer side portion) of the fluid application range is largely affected by an air flow and furthermore, the influence of the air flow becomes more remarkable as a traveling speed of the vehicle becomes higher. Accordingly, on the basis of the actual case mentioned above, it is possible to set the fluid application range previously taking into consideration the air flow at a time when the vehicle travels, however, in this structure, the fluid application range at the stopping time is displaced to the high position, which is inappropriate position. As a result, it is unavoidable to set the fluid application range to a middle fluid application range between one at the stopping time and one at the traveling time, and there is a problem that the optimum fluid application range can be obtained in neither at the stopping time nor at the traveling time.

Accordingly, in conventional, as shown in Japanese Patent Application Laid-Open (JP-A) No. 2000-52939, there is proposed a structure in which a protruding amount of lip portions respectively formed in a protruding manner in upper and lower edge portions of an injection port for the purpose of regulating an injection range of the washer fluid is set so that the lip portion in the lower side is shorter than the lip portion in the upper side, thereby regulating the injection of the washer fluid in such a manner as to prevent the injection of the washer fluid to the upper side from becoming far from a center of the nozzle, so that the air flow at the vehicle traveling time is hard to affect the washer fluid.

In this case, in the conventional structure mentioned above, the lip portion in the upper side is protruded in comparison with the lip portion in the lower side, however, since the nozzle itself is a small member, the protruding lip portion in the upper side is easily affected by an external world. Namely, there is a problem that a sense of unity in design is reduced at a time when the nozzle is assembled in a nozzle body, and a problem to be solved by the present invention exists here.

Further, the conventional nozzle body mentioned above is formed by machining of a metal material, and is expensive in view of cost. Then, it is proposed that the nozzle is formed by a resin material, however, in the case that the nozzle having the different protruding lengths between the upper and lower lip portions as described above, it is supposed that a force applied from the external world tends to be concentrated in the protruding upper lip portion, so that it is impossible to employ the structure having this shape, and a problem to be solved also exists here.

SUMMARY OF THE INVENTION

The present invention is made by taking the actual case mentioned above into consideration, and an object of the present invention is to solve the problems. In accordance with the present invention, a nozzle structure in a washer fluid injection apparatus, there is provided a nozzle comprising: a tubular hole portion communicated with a washer fluid supply side; an injection port communicated with the tubular hole portion and formed long from side to side; and a pair of upper and lower lip portions respectively protruding in an injection direction from upper and lower edge portions of the injection port so as to set an injection direction of a washer fluid, wherein a protruding tip portion of the lower lip portion is positioned below a lower edge of the injection port.

Further, in accordance with the structure mentioned above, it is possible to make it hard to generate the problem that the injection range of the washer fluid injected from the injection port is changed to the lower side due to the air flow when a vehicle travels.

In this structure, the protruding amounts of the upper and lower lip portions can be set to substantially the same size, whereby it is possible to improve a design property.

Further, in this structure, the lower lip portion can be formed in a stepped shape such that the protruding tip portion is positioned in a lower side.

Furthermore, in this structure, the lower lip portion can be formed in an inclined shape such that the protruding tip portion is positioned in a lower side.

In this structure, the nozzle can be formed by a resin material, and can be formed with reinforcing portions by connecting portions over left and right end portions of the upper and lower lip portions to each other in a bridge formation manner. In accordance with this structure, the lip portions are reinforced and a high strength can be obtained despite of the nozzle made of the resin.

Additionally, in this structure, in the case that the lower lip portion is formed in the stepped shape, a step surface of the lower lip portion is formed flush with the tip surfaces of the reinforcing portions. Accordingly, it is easy to set the step surface in forming a mold.

DETAILED DESCRIPTION OF THE PREFERRED EMBODIMENT

Figure 1:
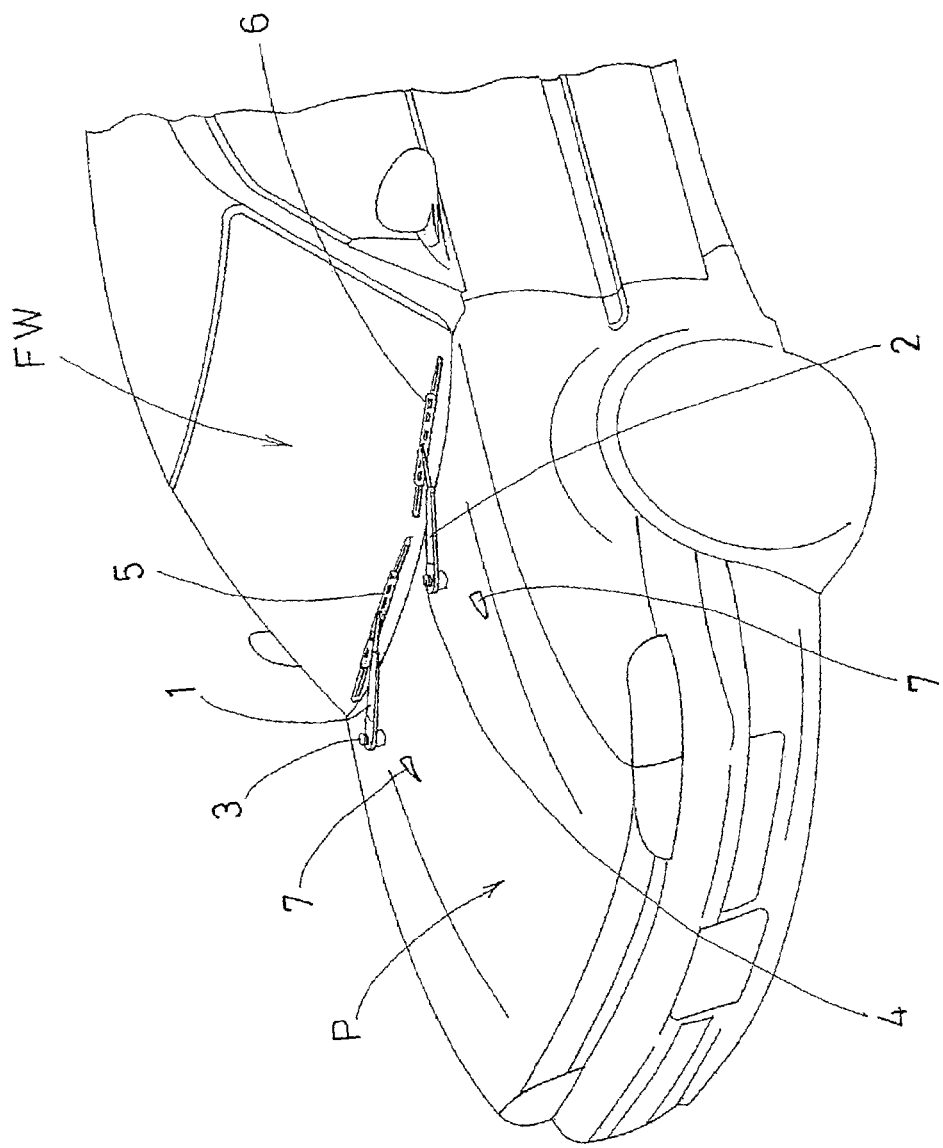
FIG. 1 is a schematic perspective view of a front portion in a vehicle.
Figure 2A:
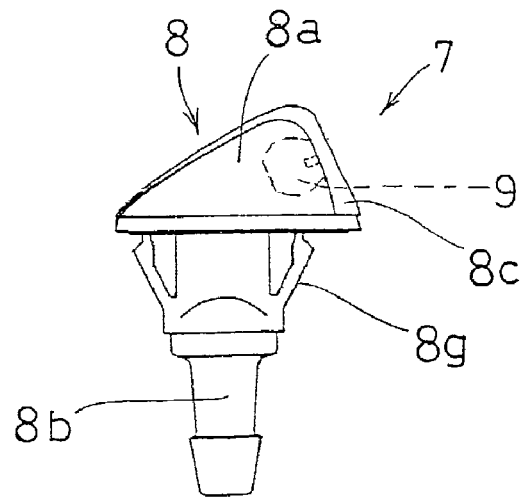
FIGS. 2A, 2B and 2C are respectively a side view and a front view of an injection nozzle in a side of an assistant driver, and a cross sectional view in a nozzle assembled portion.
Figure 2B:
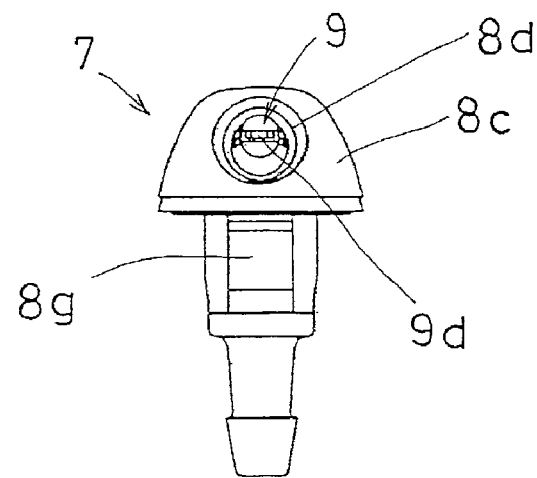
Figure 2C:
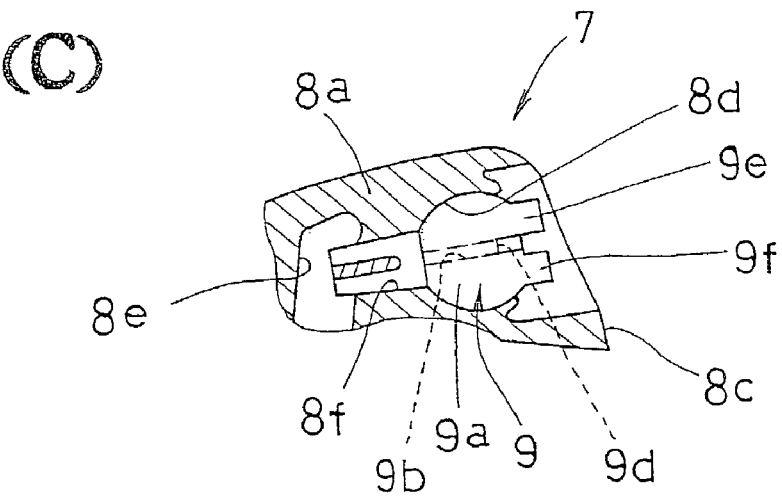
Figure 3:
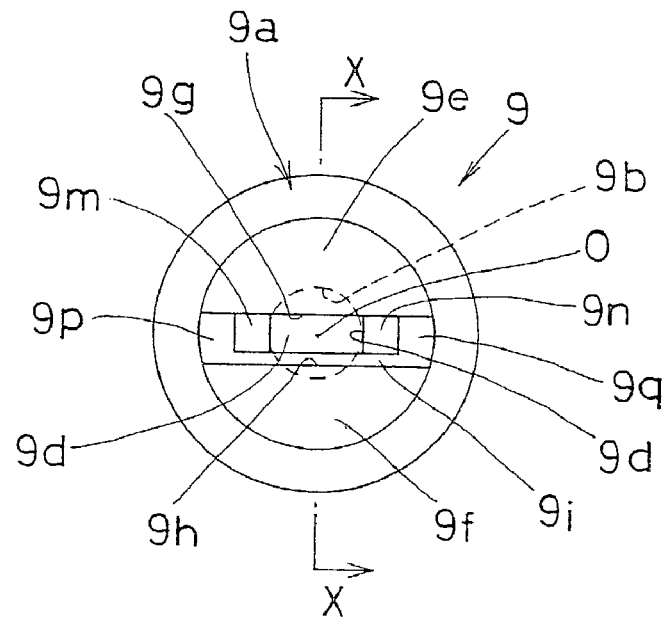
FIGS. 3A, 3B and 3C are respectively a front view of the nozzle, a cross sectional view along a line X-X in FIG. 3A, and a cross sectional view along a line Y-Y in FIG. 3B.
Figure 3:
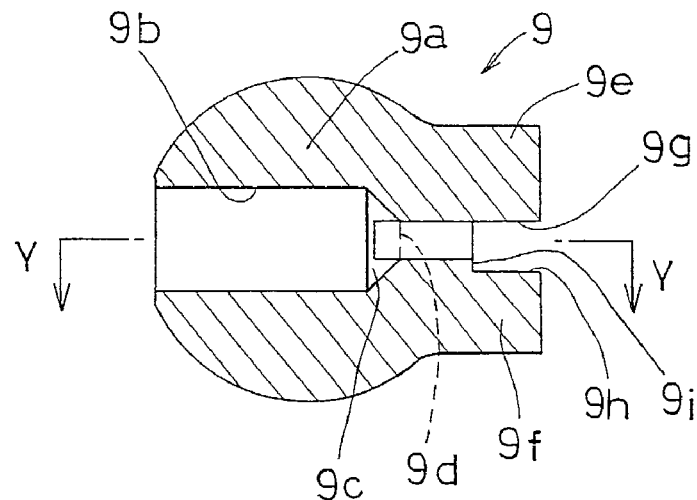
Figure 3:
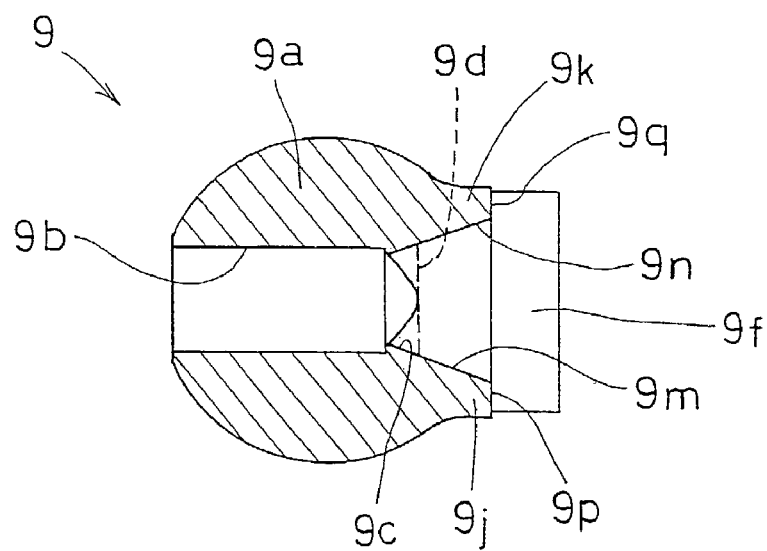
Figure 4:
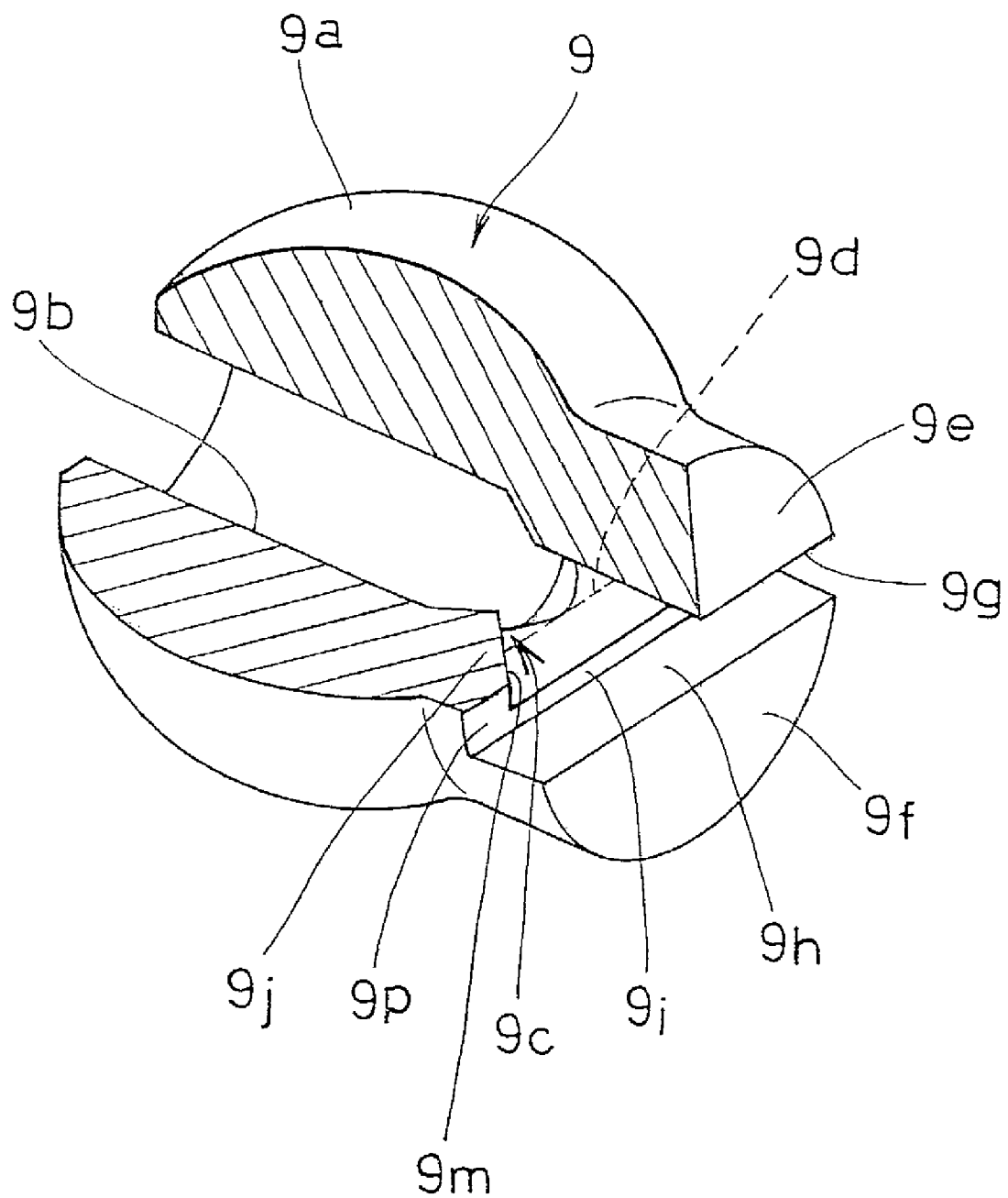
FIG. 4 is a partly cutting perspective view of the nozzle.

A description will be given of a first embodiment in accordance with the present invention with reference to FIGS. 1 to 4 and FIG. 6B.

In the drawings, reference numerals 1, 2 denote wiper arms on a driver's and a passenger's seat sides of a wiper apparatus. Respective base end portions of the wiper arms 1, 2 are integrally mounted to protruding tip portions of wiper shafts 3, 4 which are arranged on the driver's and passenger's seat sides in a front panel P of the vehicle rotatably and in an upward protruding state. Wiper blades 5, 6 are detachably attached to tip portions of the respective wiper arms 1, 2, and these wiper blades 5, 6 are set such that the wiper blades 5, 6 are brought into elastic contact with a windshield FW by a biasing spring(not shown). Then, in accordance with forward and backward rotations of the respective wiper shafts 3, 4, the wiper blades 5, 6 in the tip portions of the wiper arms 1, 2 are reciprocated and reverted on the windshield FW. Accordingly, the respective wiper blades 5, 6 are set such as to respectively slide between a lower reverse position and an upper reverse position of the windshield FW so as to wipe the window surface.

Reference numeral 7 denotes a pair of injection nozzles for injecting and supplying a washer fluid toward the windsheild FW on the driver's and the passenger's seat sides. These injection nozzles 7 are arranged at respective forward positions of the corresponding wiper shafts 3, 4 on the driver's and the passenger's seat sides on the front panel P mentioned above.

A nozzle body 8 constituting the injection nozzle 7 is provided with a holder portion 8a in which a resin nozzle 9 embodied on the basis of the present invention is incorporated, and a connection portion 8b which is integrally extended from a lower end portion of the holder portion 8a and is used for mounting to an inner side of the front panel P in an immersing manner. Further, in the holder portion 8a, there are formed an inclined window opposing surface 8c facing to the side of the windshield FW, and a mounting recess portion 8d recessed from a side of the window opposing surface 8c, where the nozzle 9 is assembled in such a manner that a position of the nozzle 9 can be freely adjusted. On the other hand, a tubular hole 8e serving as a flow passage for the washer fluid is formed inside the connection portion 8b, and the mounting recess portion 8d and the connection portion tubular hole 8e are communicated via a communication hole 8f having a narrow diameter and formed in the side of the holder portion 8a. In this case, in the nozzle body connection portion 8b, there are formed a pair of hook portions 8g for mounting to mounting holes pierced on the front panel P in a come-off preventing manner and detachably.

The nozzle 9 is structured such that a tubular hole portion 9b in a washer fluid supply side, a throttle hole portion 9c connected to the tubular hole portion 9b, and an injection port 9d formed in a transversely long shape (formed in a rectangular shape in a horizontal direction in the present embodiment) in a washer fluid injection side tip portion of the throttle hole portion 9c are formed in a center portion of a spherical body 9a inward fitted to the nozzle body mounting recess portion 8d so as to be communicated with each other. Further, a pair of upper and lower lip portions 9e, 9f respectively protruding in the washer fluid injecting direction are formed from upper and lower edge portions of the injection port 9d, and an injecting direction of the washer fluid injected from the injection port 9d is set by the lip portions 9e, 9f, whereby the washer fluid is set so as to be applied to a periphery around a preset injection hitting point of the windshield FW in a diffusion shape.

Further, each of a pair of upper and lower lip portions 9e, 9f is formed in an approximately semicircular columnar shape, and is formed such that an outer diameter thereof is smaller than an outer diameter of the spherical portion 9a. A protruding length of each of the lip portions 9e, 9f is set to the same length. Further, the injection direction of the washer fluid is set by inner side surfaces 9g, 9h opposing to each other in a vertical direction. A step surface 9i is formed in the inner side surface 9h of the lower lip portion 9f in accordance with the present embodiment so as to form a step shape in the vertical direction, and the protruding tip portion of the inner side surface 9h is positioned in a lower position than a lower edge of the injection port 9d. With the structure, a distance between a position of a nozzle center O and a position of a leading end of the upper lip portion inner side surface 9g is set smaller than a distance between the position of the nozzle center O and a position of the lower lip portion inner side surface 9h, whereby, as described later, the washer fluid injected from the injection port 9d is injected to a portion closer to the side of the center O of the nozzle 9 in the washer fluid injected to the upper side than the washer fluid injected to the lower side, and the grain diameter of the washer fluid in the upper side is greater than that of the washer fluid in the lower side so as to be hard to be affected by the air flow at the vehicle traveling time.

The step surface 9i is formed so as to be positioned in the leading end side corresponding to the washer fluid injection side in the lower lip portion 9f, that is, in the side of the windshield FW.

Further, both of the left and right end portions of the upper and lower lip portions 9e, 9f are formed as reinforcing portions 9j, 9k connected in a bridge formation manner, whereby a strength of the protruding upper and lower lip portions 9e, 9f is secured despite of the nozzle 9 formed by the resin material, and it is possible to prevent the lip portions 9e, 9f from being carelessly damaged. In this case, the reinforcing portions 9j, 9k are formed so that inner side surfaces are connected respectively to left and right edge portions of the injection port 9d, however, the inner side surfaces are formed as inclined surfaces 9m, 9n so as to be gradually apart from each other Further, tip side surfaces 9p, 9q of the reinforcing portions 9j, 9k are formed in a state of being flush with the step surface 9i, whereby the step surface 9i can be easily set in the case of integrally molding the nozzle 9 on the passenger's seat side.

In this connection, in the case that the nozzle is made of a metal, it goes without saying that it is unnecessary to purposely form the reinforcing portion, however, the reinforcing portion can be formed as a member for setting the injecting direction of the washer fluid from the injection port.

In each of the injection nozzles 7 structured above, the washer fluid is flowed via a tube (not shown) connected to the connection portion 8b of the nozzle body 8, and is injected from the injection port 9d through the connection portion tubular hole 8e, the holder portion communication hole 8f and the tubular hole portion 9b in each of the nozzles 9. At this time, the nozzle 9 in each of the injection nozzles 7 is in a state in which the upper and lower lip portions 9e, 9f are formed in a protruding manner in the upper and lower edge portions of the injection port 9d, and the reinforcing portion inclined surfaces 9m, 9n are formed in a protruding manner in the left and right edge portions of the nozzle injection port 1d, whereby the washer fluid is injected along the lip portion inner side surfaces 9g, 9h, and the reinforcing portion inclined surfaces 9m, 9n, and is set so as to be applied in a diffusion shape to a periphery around a preset injection hitting point of the windshield FW. The upper and lower lip portions 9e, 9f have the same protruding length, however, the tip portion of the lower lip portion 9f is positioned in the lower side than the lower edge portion of the injection port 9d, the grain diameter of the washer fluid injected to the upper side is larger than the grain diameter of the washer fluid injected to the lower side, and the injection state thereof is a grain diameter distribution shown in FIG. 6B (in FIG. 6, a size of dot means a grain diameter). Accordingly, the washer fluid injected from the nozzle 9 is set such that the air flow is less affected to the washer fluid in the upper side of the injection range even when the vehicle travels, and the fluid application range at the traveling time is not changed so much, at the vehicle stopping time.

In this connection, each of the injection nozzles 7 can be structured such that a check valve is installed in the nozzle body 8 and a back-flow preventing function is achieved.

In the embodiment in accordance with the present invention structured in the manner mentioned above, the respective injection nozzles 7 inject the washer fluid in the diffusion shape around the preset portions on the driver's and passenger's seat sides in the windshield FW. The nozzle 9 assembled in the injection nozzle 7 is structured such that the step surface 9i is formed on the inner side surface 9h of the lower lip portion 9f, and the injection side leading end portion of the lower lip portion 9f is positioned in the lower side than the lower edge portion of the injection port 9d. Accordingly, as in the same case of the conventional nozzle structured such that the upper lip portion in the upper and lower lip portions is long protruded, the washer fluid injected from the nozzle injection port 9d is hard to be affected by the air flow at the vehicle traveling time because the washer fluid injected to the upper side is closer to the side of the center O of the nozzle than the washer fluid injected to the lower side and the grain diameter of the washer fluid is increased. As a result, despite of the structure in which the protruding length of the lip portion is set to be the same, it is possible to prevent the problem that the washer fluid injected from the injection port 9d is affected by the air flow at the vehicle traveling time and the fluid application range to the windshield FW is changed. As a result, the nozzle 9 can be made excellent in design in which the protruding lengths of the lip portions 9e, 9f are set the same size, and it is possible to prevent the problem that the stress is concentrated to one lip portion from the external world as in the conventional structure in which one lip portion is more protruded.

Further, in the present embodiment, the nozzle 9 is integrally molded by the resin material, however, in this case, since the reinforcing portions 9j, 9k are formed in such a manner as to connect both right and left end portions of the lip portions 9e, 9f, the strengths of the lip portions 9e, 9f can be secured in the same manner as the metal nozzle, and it is possible to prevent the lip portions 9e, 9f from being damaged. Further, in this structure, since the mutually opposing inner side surfaces of the reinforcing portions 9j, 9k are formed as the inclined surfaces 9m, 9n so as to be connected to the left and right edge portions of the injection port 9d, the injecting direction of the washer fluid injected from the injection port 9d is set not only by the upper and lower lip portions 9e, 9f but also the left and right inclined surfaces 9m, 9n, and it is possible to more securely set the fluid application range to the windshield FW.

Furthermore, in this structure, the injecting direction of the nozzle 9 is adjusted by inserting an adjusting device (not shown) such as a pin into the injection port 9d and rotating and sliding the nozzle 9 within the nozzle body mounting recess portion 8d. Namely, the nozzle 9 can be adjusted upward by inserting the adjusting device into the injection port 9d and pressing down the adjusting device in a side of the injection port 9d with the base end side of the adjusting device supported to the leading end portion of the upper lip portion inner side surface 9g. Further, the nozzle 9 can be adjusted downward by inserting the adjusting device into the injection port 9d and pressing up the adjusting device in the side of the injection port 9d with the base end side of the adjusting device supported to the leading end portion of the lower lip portion inner side surface 9h. At this time, because the protruding amounts of the upper and lower lip portions 9e, 9f are the same, the incline state of the adjusting device is not largely changed even when the step surface 9i is provided in the inner side surface 9h of the lower lip portion 9f. Accordingly, there is not generated the problem that the incline of the adjusting device is sharp, the base end portion of the adjusting device is in contact with the front panel P of the vehicle body, and it is impossible to adjust, such as the case of downward adjusting the conventional nozzle in which the lower lip portion is short.

In this case, it is of course that the present invention is not limited to the embodiment mentioned above, and the lower lip portion may be structured as far as the protruding leading end portion is positioned in the lower side than the lower side edge portion of the injection port. The present invention can be structured such as a second embodiment shown in FIG. 5A. In this embodiment, a step surface 13i for forming a lower lip portion 13f of a nozzle 13 in a step shape is formed in a state of being connected to an injection port 13d.

Further, as a structure for positioning the protruding leading end portion of the lip portion in the lower side than the lower side edge portion of the injection port, the structure can be formed in an inclined shape in addition to the step shape. As the structure mentioned above, there is, for example, a structure in accordance with a third embodiment shown in FIG. 5B. A nozzle 14 in accordance with the present embodiment is structured such that a whole of an inner side surface 14h of a lower lip portion 14f protruding from a lower side edge portion of an injection port 14d is formed as an inclined surface which is inclined more downward in accordance with moving close to the protruding end.

Figure 5:
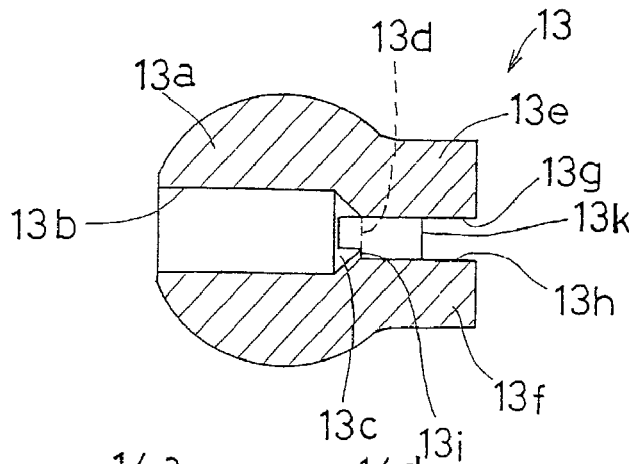
FIGS. 5A, 5B, 5C and 5D are respectively cross sectional views of nozzles in accordance with second, third, fourth and fifth embodiments.
Figure 5:
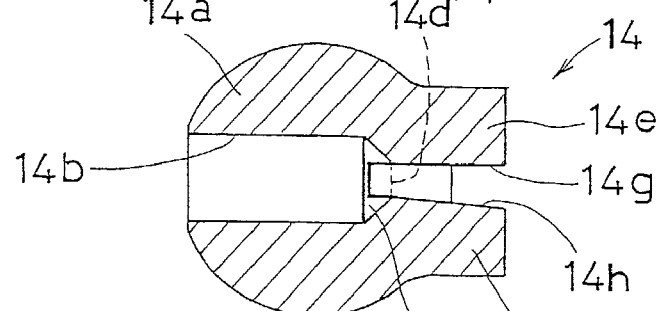
Figure 5:
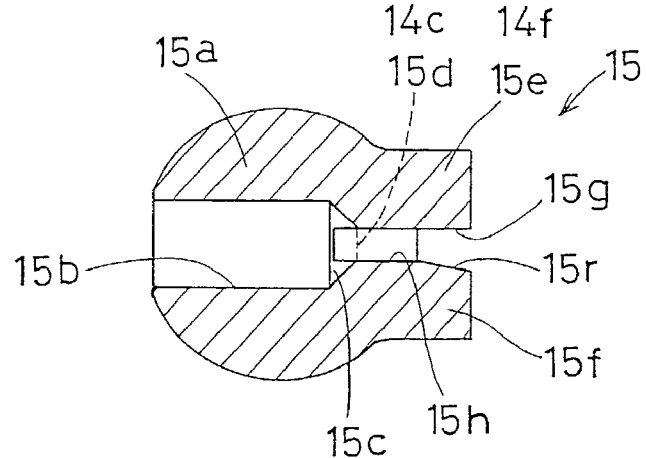
Figure 5:
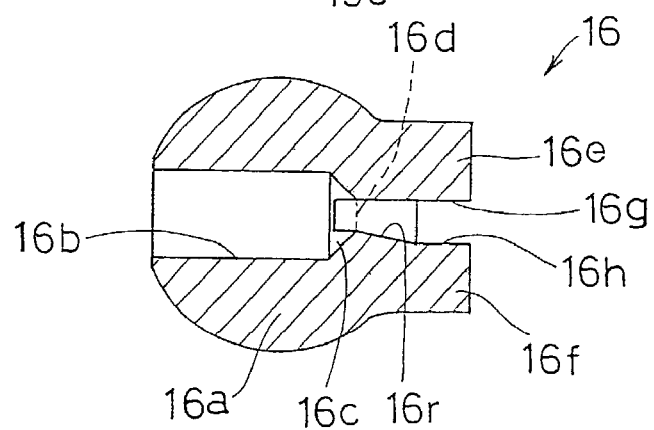
Figure 6:
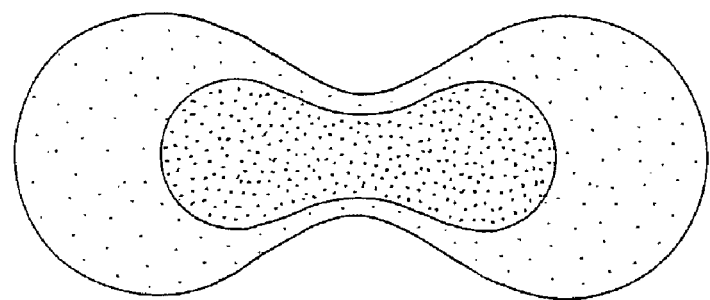
FIG. 6A is a pattern diagram of a distribution of grain diameters in an injection state of a washer fluid injected by a conventional nozzle.
FIG. 6B is a pattern diagram of a distribution of grain diameters in an injection state of a washer fluid injected by the nozzle in accordance with the first embodiment.
Figure 6:
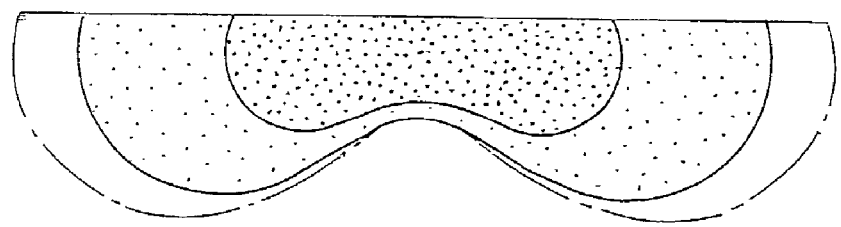

Furthermore, the structure can be made such as a fourth embodiment shown in FIG. 5C. A nozzle 15 in accordance with the present embodiment is structured such that an inclined surface 15r formed in a lower lip portion 15f is formed on an inner side surface 15h extending from a protruding leading end position of reinforcing portions 15j, 15k formed in upper and lower lip portions 15e, 15f to a tip portion of the lower lip portion 15f.

In addition, a nozzle 16 in accordance with a fifth embodiment shown in FIG. 5D is structured such that an inclined surface 16r formed in a lower lip portion 16f is formed on an inner side surface 16h extending from a lower side edge portion of an injection port 16d and a protruding leading position of reinforcing portions 16j, 16k formed in upper and lower lip portions 16e, 16f.

In accordance with the second, third, fourth and fifth embodiments, in the same manner as the first embodiment mentioned above, it is possible to prevent the problem that the injection range of the washer fluid from the injection port is changed by the influence given by the air flow during the traveling, without changing the protruding lengths of the upper and lower lip portions.

INDUSTRIAL APPLICABILITY

The injection nozzle in which the present invention is carried out injects the washer fluid in the diffusion shape. The nozzle assembled in the injection nozzle is structured such that the protruding tip portion of the lower lip portion is positioned in the lower side than the lower side edge portion of the injection port. Accordingly, in the same manner as the nozzle structured such that the upper lip portion is protruded long in the conventional upper and lower lip portions, the washer fluid injected from the nozzle injection port is closer to the side of the nozzle center in the washer fluid injected upward than the washer fluid injected downward, the grain diameter of the washer fluid is increased, and it is possible to make the washer fluid hard to be affected by the air flow at the vehicle traveling time. As a result, despite of the same protruding length of the lip portion, there is not the problem that the washer fluid injected from the injection port is affected by the air flow at the vehicle traveling time, and the fluid application range to the window is changed. Further, the nozzle can be made excellent in design in which the protruding length of the lip portion is set to be the same size, there is not the problem that the stress is concentrated to one lip portion from the external world, as in the conventional structure in which one lip portion is protruded more, and the industrial applicability mentioned above is obtained.

What is claimed is:

1. A nozzle structure in a washer fluid ejection apparatus having a nozzle, said nozzle comprising:
   a tubular hole portion communicated with a washer fluid supply side;
   a throttle hole portion formed continuously from the tubular hole portion;
   an ejection port formed in a transversely long shape in a washer fluid ejection side tip portion of the throttle hole portion; and
   a pair of upper and lower lip portions respectively protruding in an ejection direction from upper and lower edge portions of the ejection port with upper and lower inner side surfaces of the pair of the upper and lower lip portions that are facing with each other being horizontally wider than the ejection port so as to set an ejection direction of a washer fluid, wherein a protruding tip portion of the lower lip portion is formed to be a stepped surface such that the protruding tip portion is positioned lower than the lower side of the ejection port, and a distance between a position of a nozzle center and a position of a leading end of the upper lip portion inner side surface is set smaller than a distance between the position of the nozzle center and a position of the lower lip portion inner side surface.

2. The nozzle structure in a washer fluid ejection apparatus according to claim 1, wherein the protruding amounts of the upper and lower lip portions are set to substantially the same size.

3. The nozzle structure in a washer fluid ejection apparatus according to claim 2, wherein the nozzle is formed of a resin material, and is formed with reinforcing portions connecting portions between side portions of the upper and lower lip portions.

4. The nozzle structure in a washer fluid ejection apparatus according to claim 1, wherein the nozzle is formed of a resin material, and is formed with reinforcing portions connecting portions between side portions of the upper and lower lip portions.

5. The nozzle structure in a washer fluid ejection apparatus according to claim 4, wherein in the case that the lower lip portion is formed in the stepped shape, a step surface of the lower lip portion is formed flush with tip surfaces of the reinforcing portions.

6. The nozzle structure in a washer fluid ejection apparatus according to claim 4, wherein in the case that the lower lip portion is formed in the stepped shape, a step surface of the lower lip portion is offset from tip surfaces of the reinforcing portions.

7. A nozzle structure in a washer fluid ejection apparatus having a nozzle, said nozzle comprising:
   a tubular hole portion communicated with a washer fluid supply side;
   a throttle hole portion formed continuously from the tubular hole portion;
   an ejection port formed in a transversely long shape in a washer fluid ejection side tip portion of the throttle hole portion; and
   a pair of upper and lower lip portions respectively protruding in an ejection direction from upper and lower edge portions of the ejection port so as to set an ejection direction of a washer fluid, wherein a protruding tip portion of the lower lip portion is formed in an inclined shape such that the protruding tip portion is downwardly inclined relative to the lower edge of the ejection port.

8. The nozzle structure in a washer fluid ejection apparatus according to claim 7, wherein the nozzle is formed of a resin material, and is formed with reinforcing portions connecting portions between side portions of the upper and lower lip portions.

9. The nozzle structure in a washer fluid ejection apparatus according to claim 7, wherein a start of the downward inclination of the lower edge starts at the ejection port.

10. The nozzle structure in a washer fluid ejection apparatus according to claim 7, wherein the protruding amounts of the upper and lower lip portions are set to substantially the same size.

* * * * *